(12) United States Patent
Wuerfel

(10) Patent No.: US 8,480,142 B2
(45) Date of Patent: Jul. 9, 2013

(54) SCREENING PANEL FOR A SENSOR UNIT OF A MOTOR VEHICLE

(75) Inventor: Manfred Wuerfel, Leonberg (DE)

(73) Assignee: Dr. Ing. H.C. F. Porsche Aktiengesellschaft (DE)

( * ) Notice: Subject to any disclaimer, the term of this patent is extended or adjusted under 35 U.S.C. 154(b) by 0 days.

(21) Appl. No.: 13/365,287

(22) Filed: Feb. 3, 2012

(65) Prior Publication Data

US 2012/0200121 A1  Aug. 9, 2012

(30) Foreign Application Priority Data

Feb. 4, 2011  (DE) .......................... 10 2011 000 501

(51) Int. Cl.
*B60R 19/48*  (2006.01)

(52) U.S. Cl.
USPC .......................................................... 293/117

(58) Field of Classification Search
USPC .................................. 293/117, 120, 121, 122
See application file for complete search history.

(56) References Cited

U.S. PATENT DOCUMENTS 7,613,013 B2 * 11/2009 Gau .............................. 361/810

FOREIGN PATENT DOCUMENTS

| DE | 103 36 358 | 3/2005 |
|---|---|---|
| DE | 102005037151 | 2/2007 |
| DE | 102007045001 | 4/2009 |
| DE | 10 2009 018 792 | 11/2009 |
| DE | 202009012591 | 1/2010 |

* cited by examiner

*Primary Examiner* — Dennis Pedder
*Assistant Examiner* — Beverly Becker
(74) *Attorney, Agent, or Firm* — Gerald E. Hespos; Michael J. Porco; Matthew T. Hespos

(57) ABSTRACT

An adaptive cruise control device in a front part of a motor vehicle has a sensor unit fixedly connected to a crossmember of the vehicle body. The sensor unit has a sensor eye. A screening panel assembly is arranged at the front in a manner adjusted to fit a passage opening in the front part of the vehicle. The screening panel assembly has a holding frame mounted behind the passage opening. The holding frame has an opening exposing the sensor eye. An outer panel frame is mounted to the holding frame at the opening of the holding frame to partly surround and expose the sensor eye. An inner sensor panel is between the outer panel frame and the sensor unit and has an opening surrounding and exposing the sensor eye.

6 Claims, 8 Drawing Sheets

_US 8,480,142 B2_

SCREENING PANEL FOR A SENSOR UNIT OF A MOTOR VEHICLE

CROSS REFERENCE TO RELATED APPLICATION

This application claims priority under 35 USC 119 to German Patent Appl. No. 10 2011 000 501.3 filed on Feb. 4, 2011, the entire disclosure of which is incorporated herein by reference.

BACKGROUND OF THE INVENTION

1. Field of the Invention

The invention relates to a screening panel for a sensor unit of a motor vehicle, such as a screening panel for an adaptive cruise control device with a sensor unit that has a sensor eye and that is arranged in a manner adjusted to fit a passage opening in the front part of the vehicle.

2. Description of the Related Art

DE 10 2009 018 792 A1 discloses a holding element for a distance sensor of a motor vehicle that can be fixed to a front crossmember and to an assembly support of the motor vehicle. The holding element is partially elastically deformable so that tolerance compensation between the supports is possible. DE 103 36 358 A1 also discloses an adjustable sensor holder for mounting a sensor on a plastic outer part of a motor vehicle. A rotary shaft is arranged on the outer surface of the sensor holder perpendicular to the sensor axis. The sensor holder is mounted in a vertically rotatable manner in a recess in the plastic outer part by means of the rotary shaft. Latching points are arranged on the outer surface of the sensor holder and the plastic outer part latches into the latching points so that the vertical orientation of the sensor holder can be adjusted.

The object of the invention is to provide a screening panel for a sensor unit on the front part of a vehicle for a sensor arranged in a sensor panel so that tolerance compensation in the lateral direction of the vehicle is assured.

SUMMARY OF THE INVENTION

The invention relates to a screening panel in the form of a panel frame arranged at the front to cover the sensor panel. The screening panel accommodates the sensor or the sensor eye, and is arranged all the way around so that no gap is formed between the sensor panel and the panel frame. More particularly, the sensor unit is connected fixedly to a crossmember of the vehicle body and comprises a sensor panel that surrounds the sensor eye by way of an opening and is situated opposite a panel frame that surrounds the sensor eye in the region of the sensor panel. The sensor panel is arranged in a holding frame that can be mounted behind the passage opening in the front part.

The sensor unit preferably is arranged in a bracket and the sensor panel preferably is connected fixedly to the sensor unit by latching and holding means on the rear face of the sensor panel. The panel frame preferably is on the front face of the holding frame and is connected fixedly to the holding frame by clip and interlocking elements. Thus, the sensor panel is connected fixedly to the sensor unit and the panel frame is connected fixedly to the holding frame of the front part. Accordingly, the panel frame can compensate for tolerances in the lateral direction.

Supporting means are provided on the front face of the sensor panel and supporting ribs are provided on side edges and on an upper edge to support the sensor panel on the panel frame. The supporting ribs are adjusted to fit the panel frame, which is arranged at a distance from the sensor panel, and the supporting means are adjusted to fit the holding frame, which is held in the front part.

The panel frame has a u-profiled cross section, with two vertically running limbs and a lower horizontal web to border the sensor eye or the sensor panel. The limbs are directed inward in the direction of the sensor panel and the web to create a gap-free termination relative to the sensor panel.

The holding frame is connected to the front part by connection and clip elements on the inside of the front part. This connection enables the holding frame to be mounted on the front part in a simple manner.

The sensor eye may project into the opening in the holding frame and may be surrounded by a sensor panel that has passage openings on both sides for radiator air of a front radiator in the vehicle. The passage opening in the front part is open on both sides of the sensor panel, and therefore radiator feed air can flow to the radiator. Thus, a panel frame is not used, as in the other embodiment above.

DETAILED DESCRIPTION OF THE PREFERRED EMBODIMENTS

Figure 1:
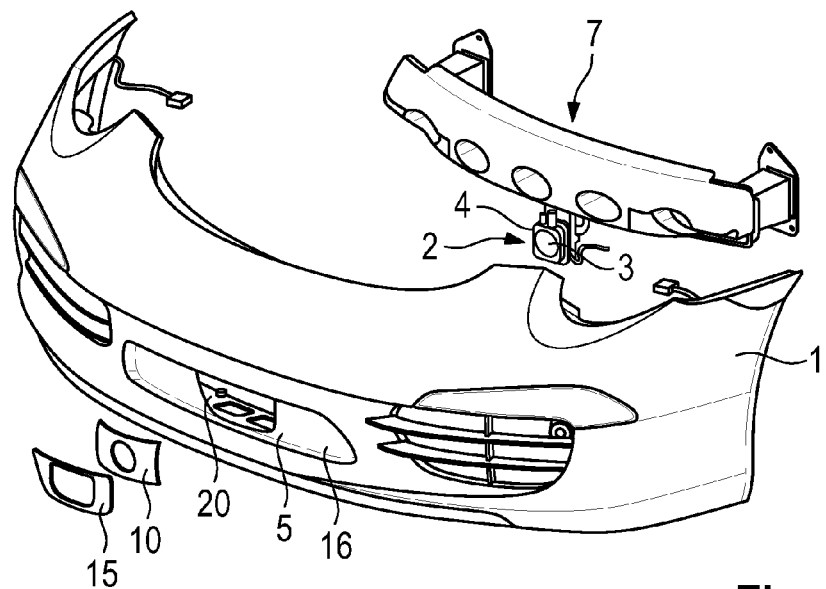
FIG. 1 is an oblique view of a front part of a motor vehicle with a holding frame inserted, and also with a fronting sensor panel and a panel frame and a sensor which is held on a crossmember.

An adaptive cruise control device, also called an ACC sensor 2, is arranged in the front part 1 of a motor vehicle. The adaptive cruise control device is held in the front part 1 in such a way that a sensor eye 3 of the sensor unit 4 projects through or into a laterally running passage opening 5 in the front part 1 and is mounted such that it is exposed and visible from the front.

Figure 1A:
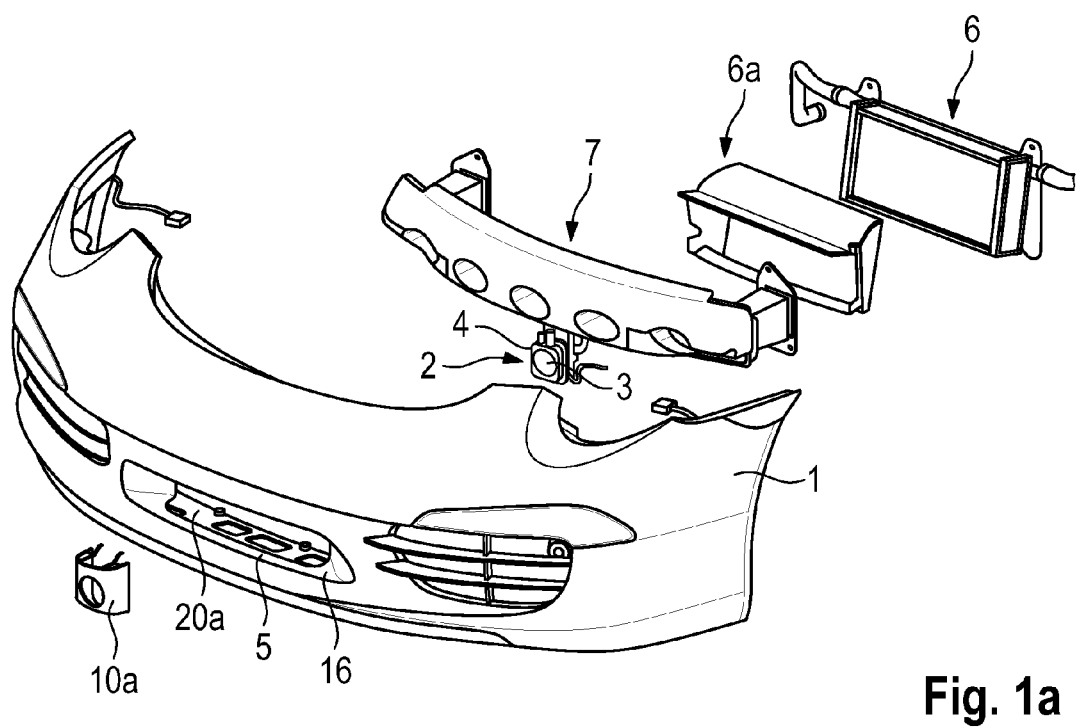
FIG. 1a is an oblique view of the front part of the vehicle with a radiator unit, a sensor on the crossmember and a sensor panel without a panel frame.
Figure 2:
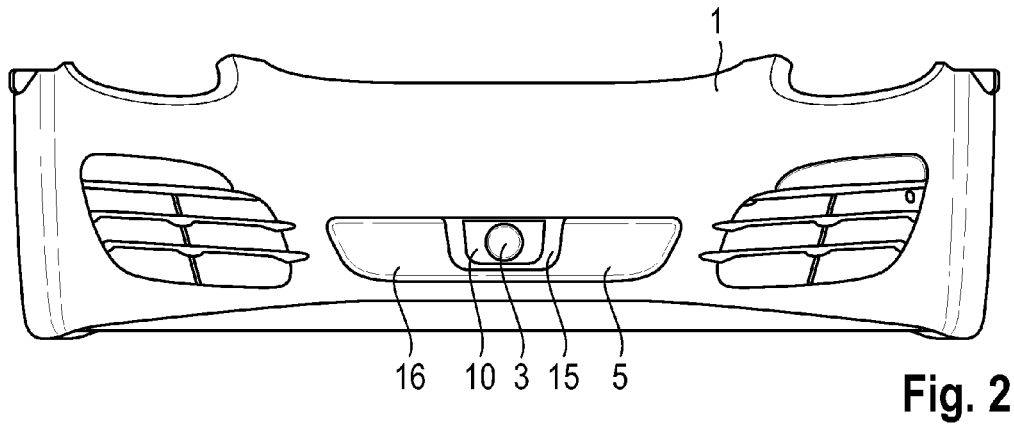
FIG. 2 is a front view according to FIG. 1 of the inserted sensor.
Figure 3:
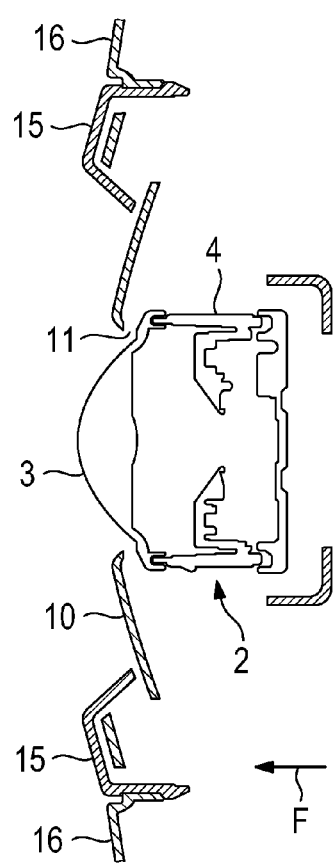
FIG. 3 is a horizontal section through the front part with the sensor and the sensor panel and also the panel frame and the holding frame.
Figure 4:
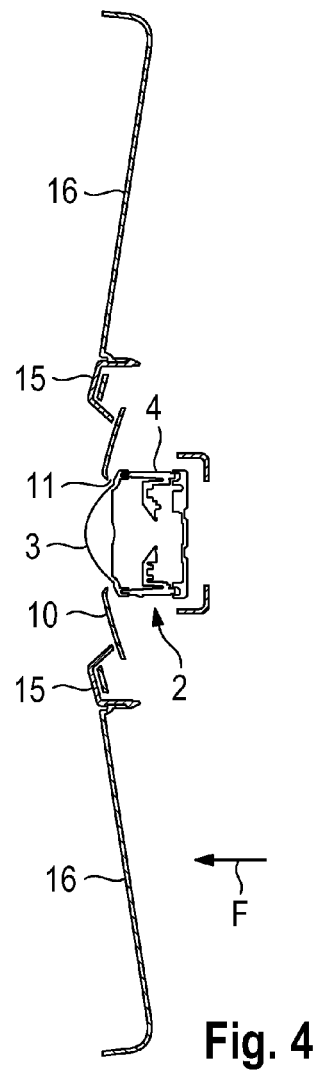
FIG. 4 is a horizontal section through the front part with the sensor and the sensor panel and also the panel frame and the holding frame.
Figure 5:
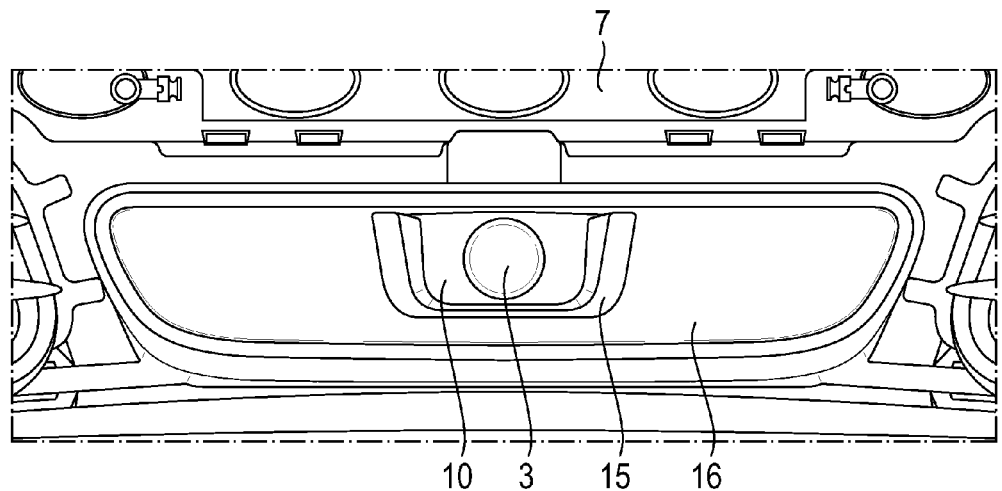
FIG. 5 is a front view of the holding frame with the panel frame, the sensor panel and the sensor inserted.
Figure 6:
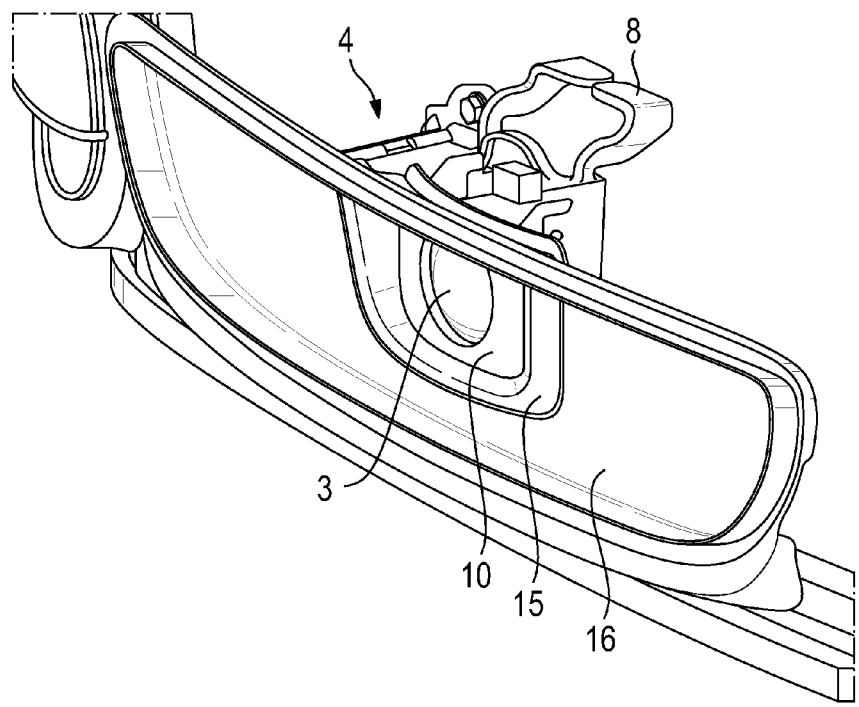
FIG. 6 is an oblique view of the holding frame with the sensor unit.

FIGS. 1 and 2 show an embodiment of a vehicle without a central radiator unit. FIG. 1a shows a variant with a central radiator unit 6 and with an air guide 6a arranged in front of it. The front parts 1 of both vehicles are of identical design and are provided with the laterally running passage opening 5.

The sensor unit 4 with the sensor 2, which comprises the sensor eye 3, is held on a crossmember 7 that is connected to the vehicle body by bearings 8 and is arranged below the crossmember 7.

A sensor panel 10 is connected to the sensor unit 4. The sensor panel 10 has an opening 11 that surrounds the sensor eye 3 and exposes the sensor eye 3. The connection between the sensor panel 10 and the sensor unit 4 is established by hook connections or holding and mounting elements 12, 12a, 12b. Centering means 14 can also be provided.

A panel frame 15 is arranged opposite the sensor panel 10 and is connected to a holding frame 16 that can be mounted on the front part 1. Latching and/or clip means 18, 17 are arranged at the borders of the panel frame 15 and are used for the mounting. More particularly, the clip means 17 are arranged at the upper border of the panel frame 15 and latching or interlocking means 18 are arranged at the lateral border.

Hooks 19 are arranged at the lower border of the panel frame 15 and are arranged to correspond to the receiving means in the holding frame 16.

Figure 7:
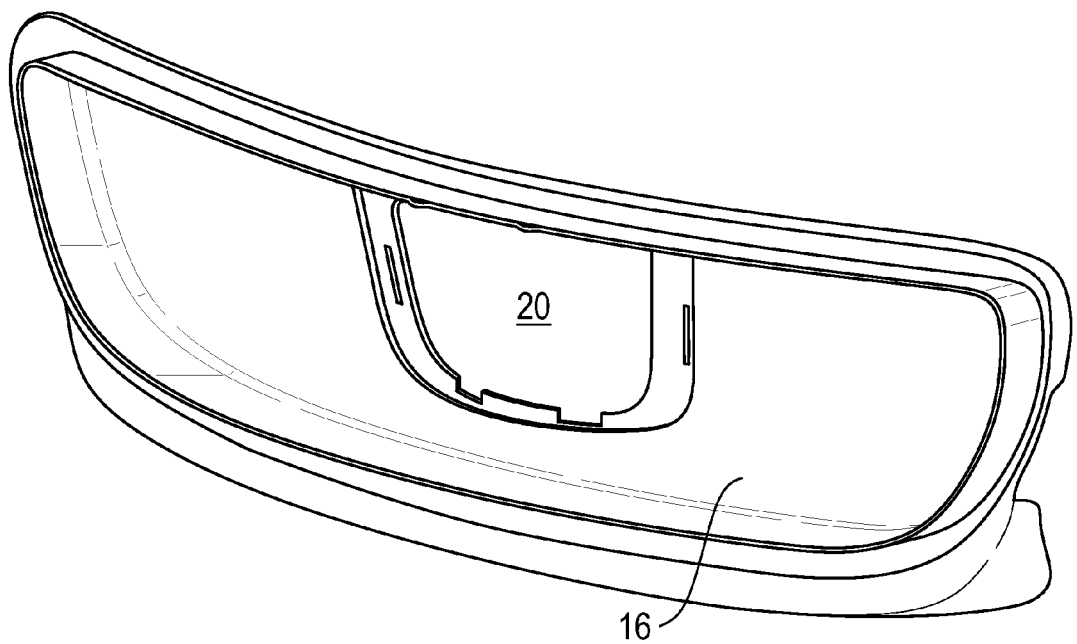
FIG. 7 is a front view of the holding frame.
Figure 8:
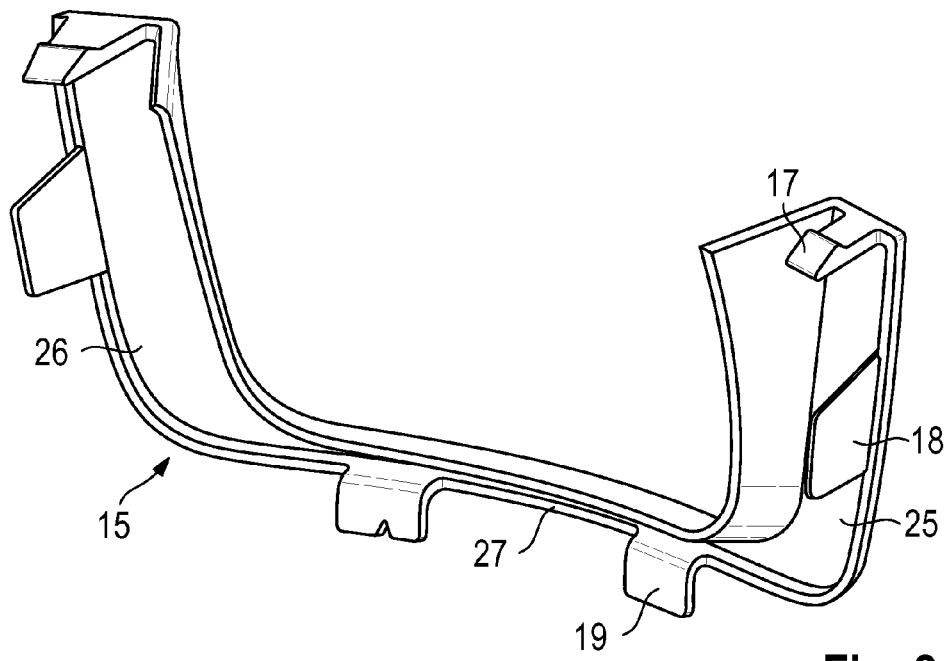
FIG. 8 is a rear view of the panel frame.
Figure 8A:
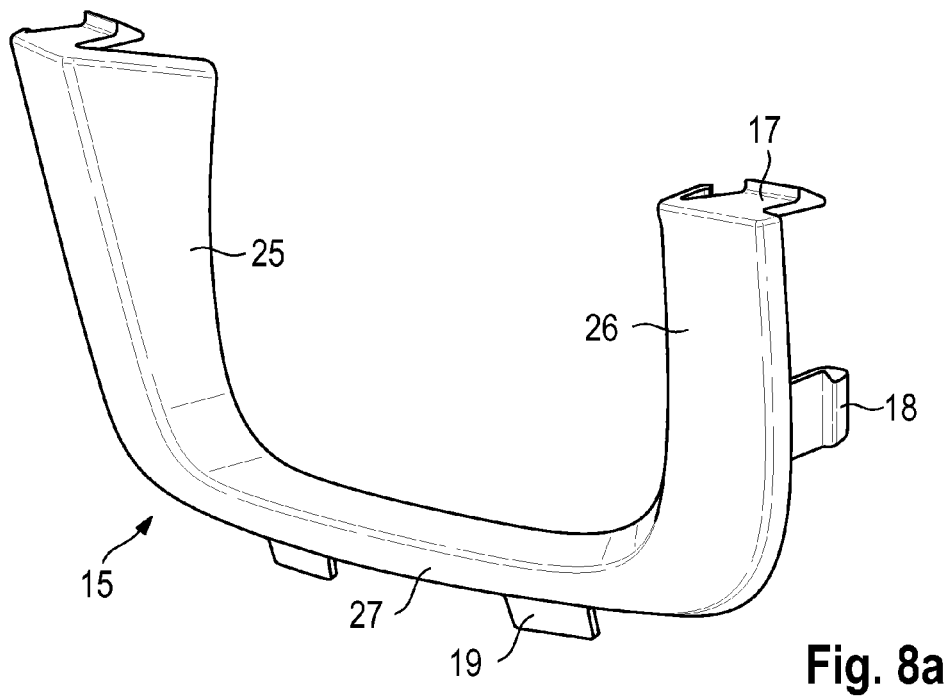
FIG. 8a is a front view of the panel frame.
Figure 9:
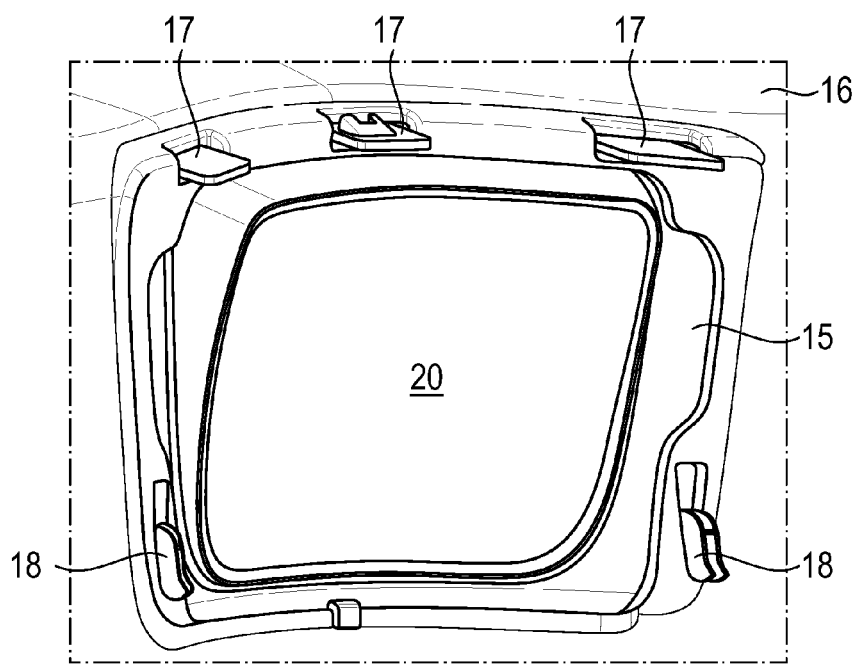
FIG. 9 is a rear view of the panel frame fit on the holding frame.
Figure 10:
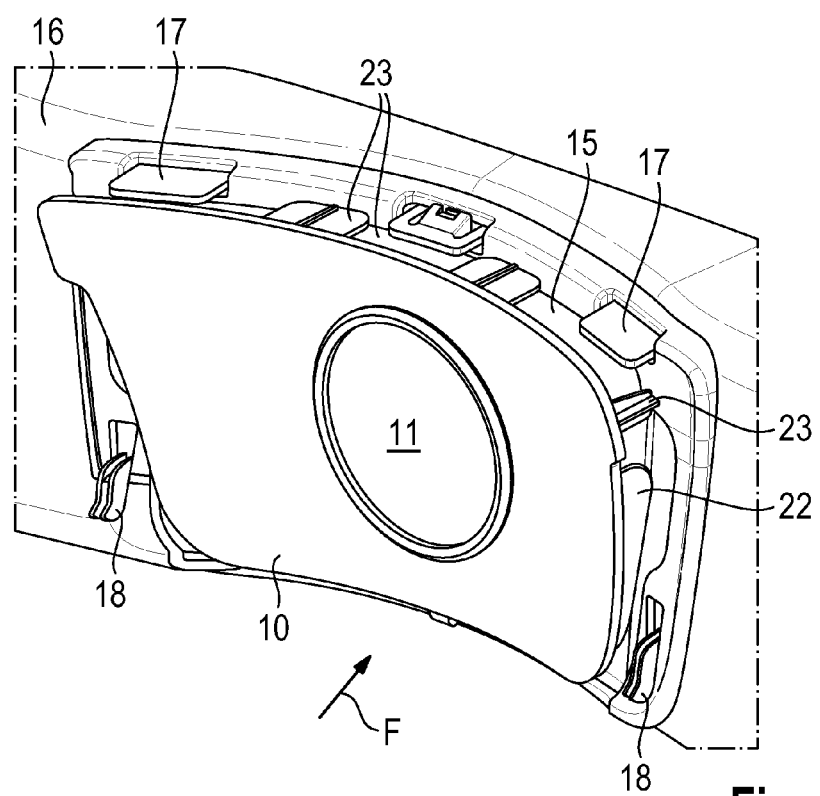
FIG. 10 is a rear view of the sensor panel with the panel frame arranged in front of said sensor panel and fixedly connected to the holding frame.

The holding frame 16 is arranged on the inside of the front part 1 and covers the passage opening 5 in the front part 1, except for a remaining opening 20 (FIGS. 1 and 7), which is closed by the sensor panel 10 and the panel frame 16 in the assembled state of the sensor unit 4, according to FIG. 2.

The holding frame 16 in the embodiment of FIG. 1a has a larger passage opening 5 than in the embodiment of FIG. 1 for feeding air to the radiator 6. The sensor eye 3 of the sensor unit 4 assembled in the front part 1 is surrounded only by a sensor panel 10a. It is possible to feed radiator air through the openings 20a within the passage opening 5 in the front part 1 on both sides of the sensor panel 10a.

The panel frame 15 is arranged on the front face of the holding frame 16 and is connected fixedly to the holding frame 16 by the clip and/or interlocking elements 17, 18, 19 and there is no fixed connection to the sensor panel 10.

Figure 11:
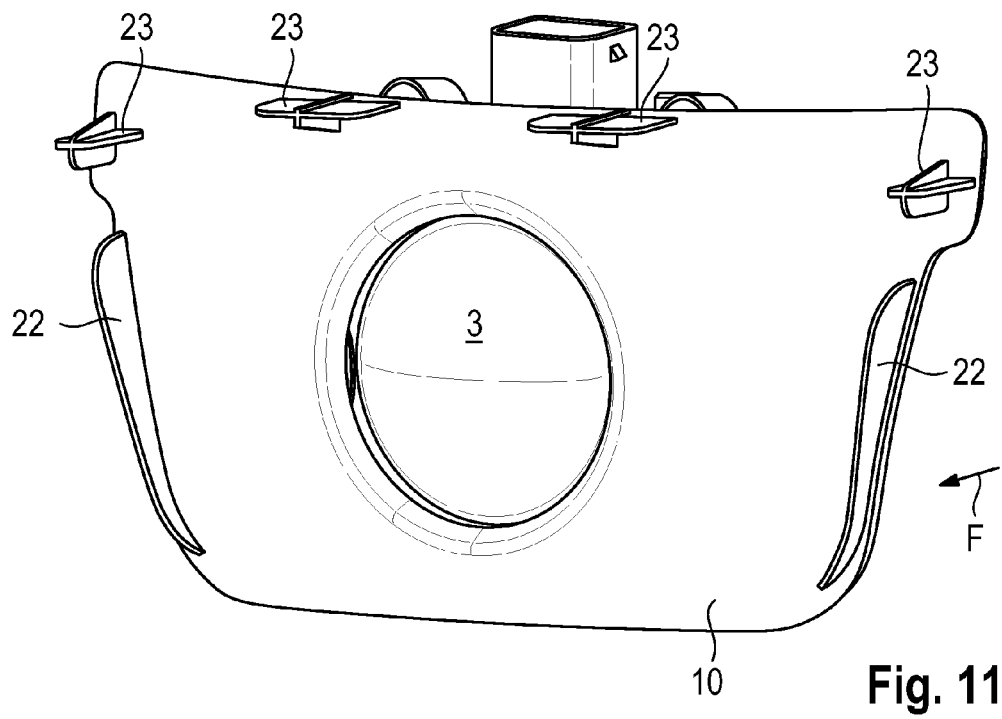
FIG. 11 is a front view of the sensor panel with supporting means at the borders.
Figure 12:
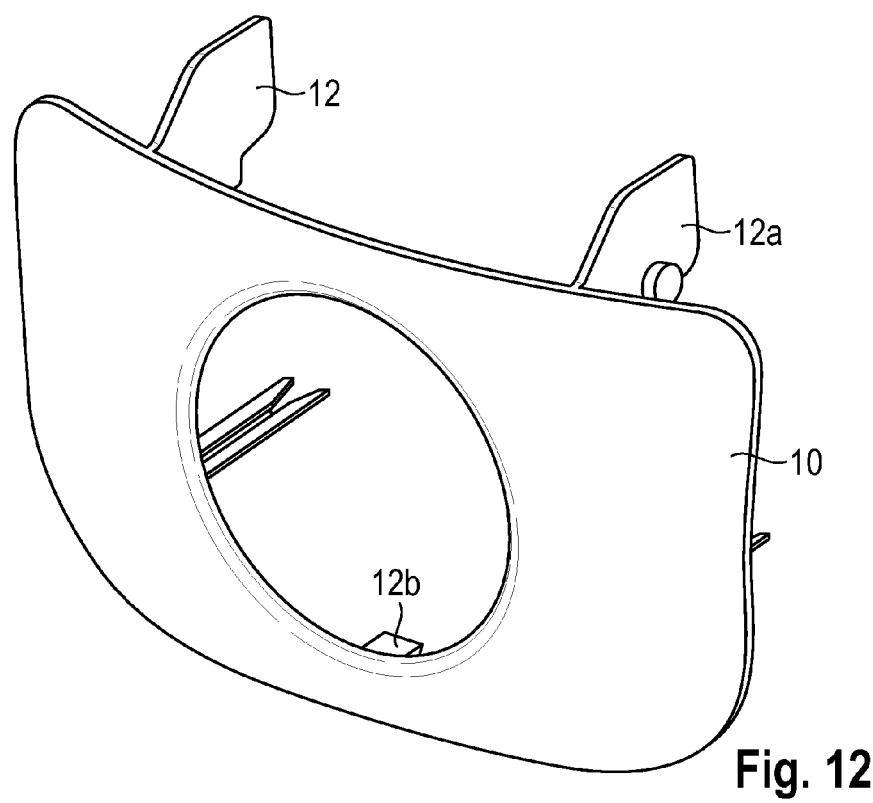
FIG. 12 is a front view of the sensor panel.
Figure 12A:
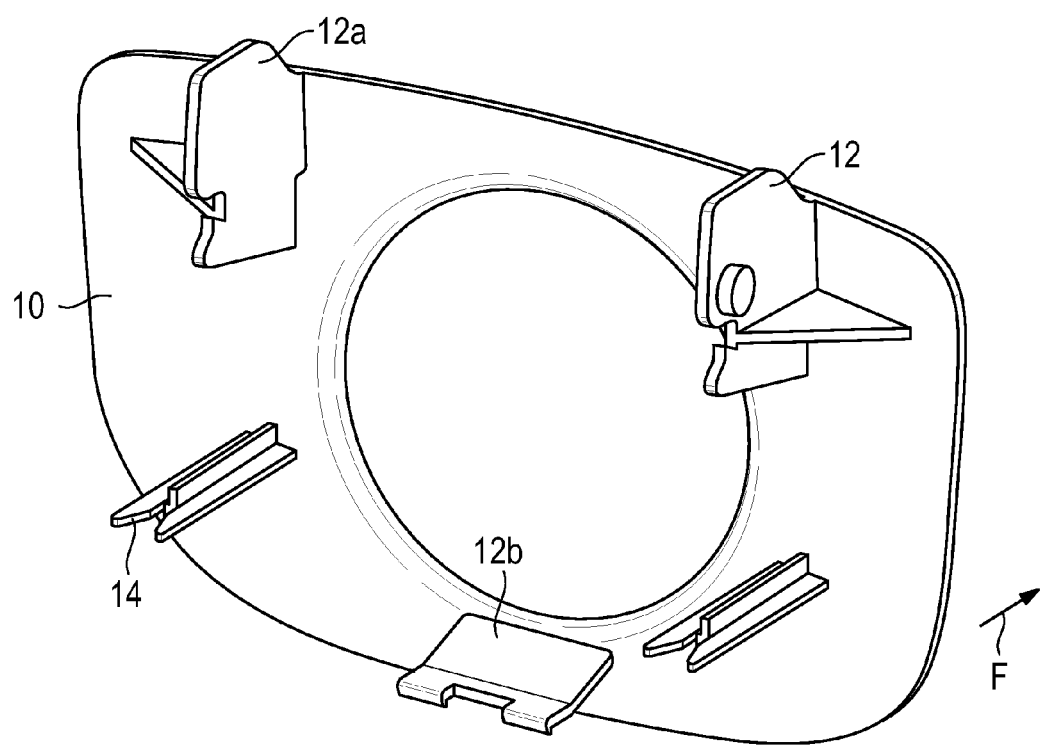
FIG. 12a is a rear view of the sensor panel with fixing means.

The sensor panel 10 is arranged at a distance from the holding frame 16 and has supporting ribs 22 and supporting means 23 that project from the front, as shown in FIG. 11. The supporting means 23 are adjusted to fit an inner face of the holding frame 16 and the supporting ribs 22 are adjusted to fit the panel frame 15. The supporting ribs and means 22, 23 respectively provide the options of point-to-point and linear support.

The panel frame 15 is designed with a U-shaped cross section and has two vertically running limbs 25, 26 that are adjusted to fit the sensor panel 10 and a lower horizontal web 27. The panel frame 15 also can be a closed frame. The profiling is adjusted to fit the sensor panel 10, and therefore has the visual appearance of a flat surface on the outside.

The holding frame 16 is arranged on the inside of the front part 1 and is connected fixedly to the front part 1 by connection elements, for example clip connections.

The assembly sequence is performed so that the sensor unit 4 initially is mounted on the cross member 7. The front part 1 then is mounted on the vehicle body. The sensor panel 10; 10a subsequently is placed on the sensor 2 and then, in one embodiment, the panel frame 15 is mounted on the holding frame 16.

What is claimed is:

1. A screening panel assembly for an adaptive cruise control device in a motor vehicle, the adaptive cruise control device having a sensor unit with a sensor eye, the sensor unit being connected fixedly to a crossmember of the vehicle, the screening panel assembly being arranged adjustably to fit a passage opening in a front part of the vehicle and comprising:
   a holding frame mounted behind the passage opening in the front part of the vehicle and having an opening exposing the sensor eye;
   an outer panel frame mounted to the holding frame at the opening of the holding frame, the outer panel frame at least partly surrounding and exposing the sensor eye; and
   sensor panel between the outer panel frame and the sensor unit and having an opening surrounding and exposing the sensor eye,
   wherein the sensor unit is arranged in a bracket and the sensor panel is connected fixedly to the sensor unit by latching and/or holding means arranged on a rear face of said sensor panel.

2. A screening panel assembly for an adaptive cruise control device in a motor vehicle, the adaptive cruise control device having a sensor unit with a sensor eye, the sensor unit being connected fixedly to a crossmember of the vehicle, the screening panel assembly being arranged adjustably to fit a passage opening in a front part of the vehicle and comprising:
   a holding frame mounted behind the passage opening in the front part of the vehicle and having an opening exposing the sensor eye;
   an outer panel frame mounted to the holding frame at the opening of the holding frame, the outer panel frame at least partly surrounding and exposing the sensor eye;
   a sensor panel between the outer panel frame and the sensor unit and having an opening surrounding and exposing the sensor eye; and
   substantially vertical supporting ribs projecting from opposite sides of a font face of the sensor panel and being adjustably fit to the outer panel frame so that the outer panel frame is adjustably spaced from the sensor panel, and supporting means projecting from the front face at positions in proximity to upper side edges of the sensor panel for adjustably fitting to an inner face of the holding frame.

3. A screening panel assembly for an adaptive cruise control device in a motor vehicle, the adaptive cruise control device having a sensor unit with a sensor eye, the sensor unit being connected fixedly to a crossmember of the vehicle, the screening panel assembly being arranged adjustably to fit a passage opening in a front part of the vehicle and comprising:
   a holding frame mounted behind the passage opening in the front part of the vehicle and having an opening exposing the sensor eye;
   an outer panel frame mounted to the holding frame at the opening of the holding frame, the outer panel frame at least partly surrounding and exposing the sensor eye, the outer panel frame being arranged on a front face of the holding frame and being connected fixedly to the holding frame by clips and/or interlocking elements; and
   a sensor panel between the outer panel frame and the sensor unit and having an opening surrounding and exposing the sensor eye.

4. The screening panel assembly of claim 3, wherein the panel frame has a U-profiled cross section with two substantially limbs extending from a lower web, the limbs being adjustably fit to fit the sensor panel, and the limbs and the web bordering the opening in the holding frame.

5. A screening panel assembly for an adaptive cruise control device in a motor vehicle, the adaptive cruise control device having a sensor unit with a sensor eye, the sensor unit being connected fixedly to a crossmember of the vehicle, the screening panel assembly being arranged adjustably to fit a passage opening in a front part of the vehicle and comprising:

a holding frame mounted behind the passage opening in the front part of the vehicle and having an opening exposing the sensor eye, wherein the holding frame is connected fixedly to the front part by connection elements or clip elements on an inside of the front part an outer panel frame mounted to the holding frame at the opening of the holding frame, the outer panel frame at least partly surrounding and exposing the sensor eye; and a sensor panel between the outer panel frame and the sensor unit and having an opening surrounding and exposing the sensor eye.

6. A screening panel assembly for an adaptive cruise control device in a motor vehicle, the adaptive cruise control device having a sensor unit with a sensor eye, the sensor unit being connected fixedly to a crossmember of the vehicle, the screening panel assembly being arranged adjustably to fit a passage opening in a front part of the vehicle and comprising:

a holding frame mounted behind the passage opening in the front part of the vehicle and having an opening exposing the sensor eye, wherein the holding frame is arranged behind the passage opening in the front part and the sensor eye projects into the opening in the holding frame and is surrounded by the sensor panel, passage openings being formed in a part of the passage opening in the front part for feeding air to a radiator arranged at a front part of the vehicle rearward of the sensor unit;

an outer panel frame mounted to the holding frame at the opening of the holding frame, the outer panel frame at least partly surrounding and exposing the sensor eye; and a sensor panel between the outer panel frame and the sensor unit and having an opening surrounding and exposing the sensor eye.

* * * * *